US007927107B2

(12) United States Patent
Peng et al.

(10) Patent No.: US 7,927,107 B2
(45) Date of Patent: Apr. 19, 2011

(54) ASSEMBLING STRUCTURE OF NETWORK PATCH PANEL AND PATCH MODULE

(75) Inventors: John Peng, Shenkeng Shiang (TW); Ying-Shang Lo, Taipei (TW)

(73) Assignee: John Peng, Shenkeng Shiang, Tapei County (TW)

( * ) Notice: Subject to any disclaimer, the term of this patent is extended or adjusted under 35 U.S.C. 154(b) by 0 days.

(21) Appl. No.: 12/485,445

(22) Filed: Jun. 16, 2009

(65) Prior Publication Data

US 2010/0255687 A1 Oct. 7, 2010

(30) Foreign Application Priority Data

Apr. 3, 2009 (TW) ................................ 98111315 A

(51) Int. Cl.
*H01R 29/00* (2006.01)
*H02B 1/056* (2006.01)

(52) U.S. Cl. ........................................................ 439/49

(58) Field of Classification Search .................... 439/49, 439/350–358

See application file for complete search history.

(56) References Cited

U.S. PATENT DOCUMENTS 7,179,119 B2 * 2/2007 Follingstad .................. 439/534
2010/0095572 A1 * 4/2010 Laursen et al. ................ 40/661

* cited by examiner

*Primary Examiner* — Javaid Nasri
(74) *Attorney, Agent, or Firm* — Volpe and Koenig, P.C.

(57) ABSTRACT

A network patch panel is provided. The network patch panel includes a frame having a plurality of first indentations and a plurality of second indentations; and a patch module having a plurality of first protrusions and a plurality of second protrusions, wherein the patch module is assembled within the frame by inserting each the first protrusion into a corresponding one of the plurality of first indentations, and fixed to the frame by inserting each the second protrusion into a corresponding one of the plurality of second indentations thereof.

18 Claims, 15 Drawing Sheets

ASSEMBLING STRUCTURE OF NETWORK PATCH PANEL AND PATCH MODULE

FIELD OF THE INVENTION

The present invention relates to a network patch panel, and more particularly to an assembling structure of a network patch panel and a patch module.

BACKGROUND OF THE INVENTION

The network patch panel is a patch structure for connecting and sharing network resources of lots of users in large network centers. There are a plurality of patch modules on the network patch panel. The front side of the patch module has a plurality of sockets for patch cords, and the back side thereof has a plurality of insulation displacement connectors for installing data cables, i.e. the so-called wire termination, to connect to the host. When performing the maintenance and repair, it is necessary to disassemble the patch module from the patch panel. Generally speaking, in the manufacturing process, the patch module is fixed on the patch panel by screws. When under construction, since these network patch panels have been locked on the server rack, workers have to wire termination at the back side of the server rack. This increases the difficulty in construction due to the narrow space or dim light at the back side of the server rack.

In order to overcome the drawbacks in the prior art, a network patch panel is provided. The particular design in the present invention not only solves the problems described above, but also is easy to be implemented. Thus, the present invention has the utility for the industry.

SUMMARY OF THE INVENTION

In accordance with one aspect of the present invention, an assembling structure of a network patch panel and a patch module is provided to attain the effects of saving time, convenience for assembling and disassembling, and practicability promoting. The present invention enables workers to assemble and disassemble the patch module at the front side of the server rack for facilitating the construction.

In accordance with another aspect of the present invention, a network patch panel is provided. The network patch panel includes a frame having a plurality of first indentations and a plurality of second indentations; and a patch module having a plurality of first protrusions and a plurality of second protrusions, wherein the patch module is assembled within the frame by inserting each the first protrusion into a corresponding one of the plurality of first indentations, and fixed to the frame by inserting each the second protrusion into a corresponding one of the plurality of second indentations thereof.

Preferably, each the first indentation has a first width being one of larger than and equal to that of the each first protrusion, and each the second indentation has a second width being one of larger than and equal to that of the each second protrusion.

Preferably, the second protrusion has elasticity.

Preferably, the patch module has a front side having a plurality of sockets for connecting network patch cords, and a back side having a plurality of insulation displacement connectors.

Preferably, each the first indentation is disposed corresponding to the each first protrusion, and each the second indentation is disposed corresponding to the each second protrusion.

Preferably, the patch module has a front side, and the plurality of first protrusions and the front side form a gap therebetween for wedging the patch module with the frame.

Preferably, the frame has a plurality of third indentations for exposing a part of each the second protrusion.

In accordance with a further aspect of the present invention, a patch panel is provided. The patch panel includes a frame having a plurality of first indentations and a hook component; and a patch module having an end, a hook element disposed on the end, a plurality of first protrusions, each of which corresponds to one of the plurality of first indentations, wherein the hook element is coupled with the hook component when the patch module is assembled within the frame by inserting each the first protrusion into the corresponding first indentation thereof.

Preferably, the frame has a third indentation, and the patch panel further comprises a fixing element having a second protrusion, and the fixing element is assembled within the frame by inserting the second protrusion into the third indentation, and disposed between the patch module and the frame for fixing the patch module.

Preferably, the patch module further has a front side and a gap between the front side and each the first protrusion for wedging the patch module with the frame.

Preferably, each the first protrusion has a first width not larger than that of each the first indentation, and the patch module further has a second indentation having a second width being one of larger than and equal to that of the hook component.

In accordance with further another aspect of the present invention, a network patch panel is provided. The network patch panel includes a frame having a first coupling element; and a patch module having a second coupling element, wherein the patch module is assembled with the frame by coupling the second coupling element with the first coupling element.

Preferably, the network patch panel further includes a fixing element disposed between the patch module and the frame, having a protrusion for fixing the patch module, and having a hole for disassembling the fixing element from the patch module.

Preferably, the first coupling element is an indentation, the second coupling element is a protrusion, and the protrusion has a width not larger than that of the indentation.

Preferably, the frame has a plurality of first coupling elements, and the patch module has a plurality of second coupling elements.

Preferably, the frame includes an upside and a downside respectively having the plurality of first indentations and a hook component disposed thereon.

Preferably, the plurality of first indentations on the upside are opposite to those on the downside.

Preferably, the patch module further has an indentation having a width being one of larger than and equal to that of the hook component.

Preferably, the patch module has a right side, a left side and a hook element disposed on one of the right side and the left side for coupling the hook component.

Preferably, the patch module has a front side, a back side, a plurality of sockets disposed on the front side for connecting network patch cords, and a plurality of insulation displacement connectors disposed on the back side.

Preferably, the patch module has a front side, and the second coupling element and the front side have a gap therebetween for wedging the patch module with the frame.

The above objects and advantages of the present invention will become more readily apparent to those ordinarily skilled in the art after reviewing the following detailed descriptions and accompanying drawings, in which:

BRIEF DESCRIPTION OF THE DRAWINGS

FIG. 2(*b*) shows the top view of part of the components of the network patch panel according to the first embodiment of the present invention;

FIG. 2(*c*) shows the side view of part of the components of the network patch panel according to the first embodiment of the present invention;

FIG. 4(*b*) shows the side view of part of the components of the network patch panel according to the first embodiment of the present invention;

FIG. 7(*b*) shows the top view of part of the components of the network patch panel according to the second embodiment of the present invention;

FIG. 7(*c*) shows the side view of part of the components of the network patch panel according to the second embodiment of the present invention; and FIG. 7(*d*) shows the stereogram of part of the components of the network patch panel according to the second embodiment of the present invention.

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

The present invention provides a network patch panel, which comprises a frame having a first indentation, and a patch module having a first protrusion, wherein the first indentation has a width not less than that of the first protrusion. The patch module is assembled with the frame by coupling the first protrusions with the first indentations. The network patch panel further comprises a fixing element disposed between the patch module and the frame, has a second protrusion for fixing the patch module, and has a hole for disassembling the fixing element from the patch module. The frame includes a hook component disposed on the upside and the downside, and the patch module has an indentation having a width being one of larger than and equal to that of the hook component. The patch module has a hook element disposed on one of the right side and the left side for coupling the hook component. A plurality of sockets are disposed on the front side of the patch module for connecting network patch cords, and a plurality of insulation displacement connectors are disposed on the back side of the patch module.

Figure 1:
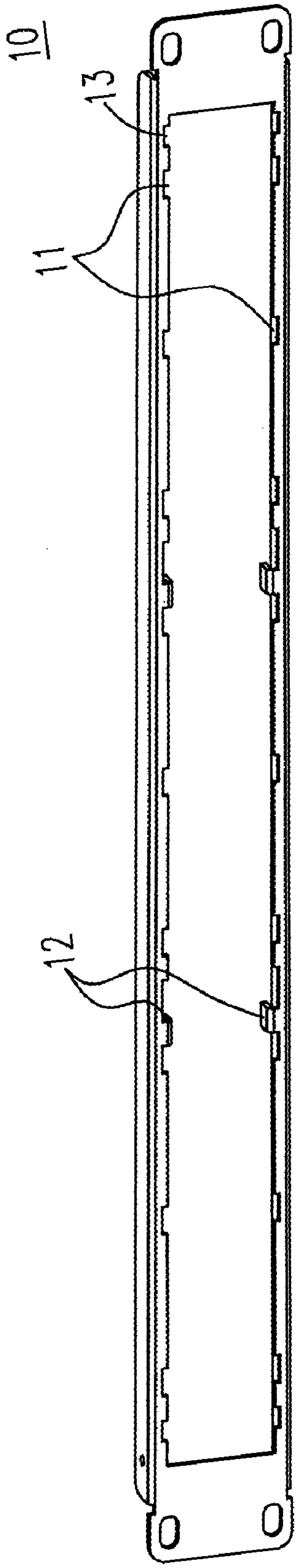
FIG. 1 shows the structure of part of the components of the network patch panel according to the first embodiment of the present invention.
Figure 2A:
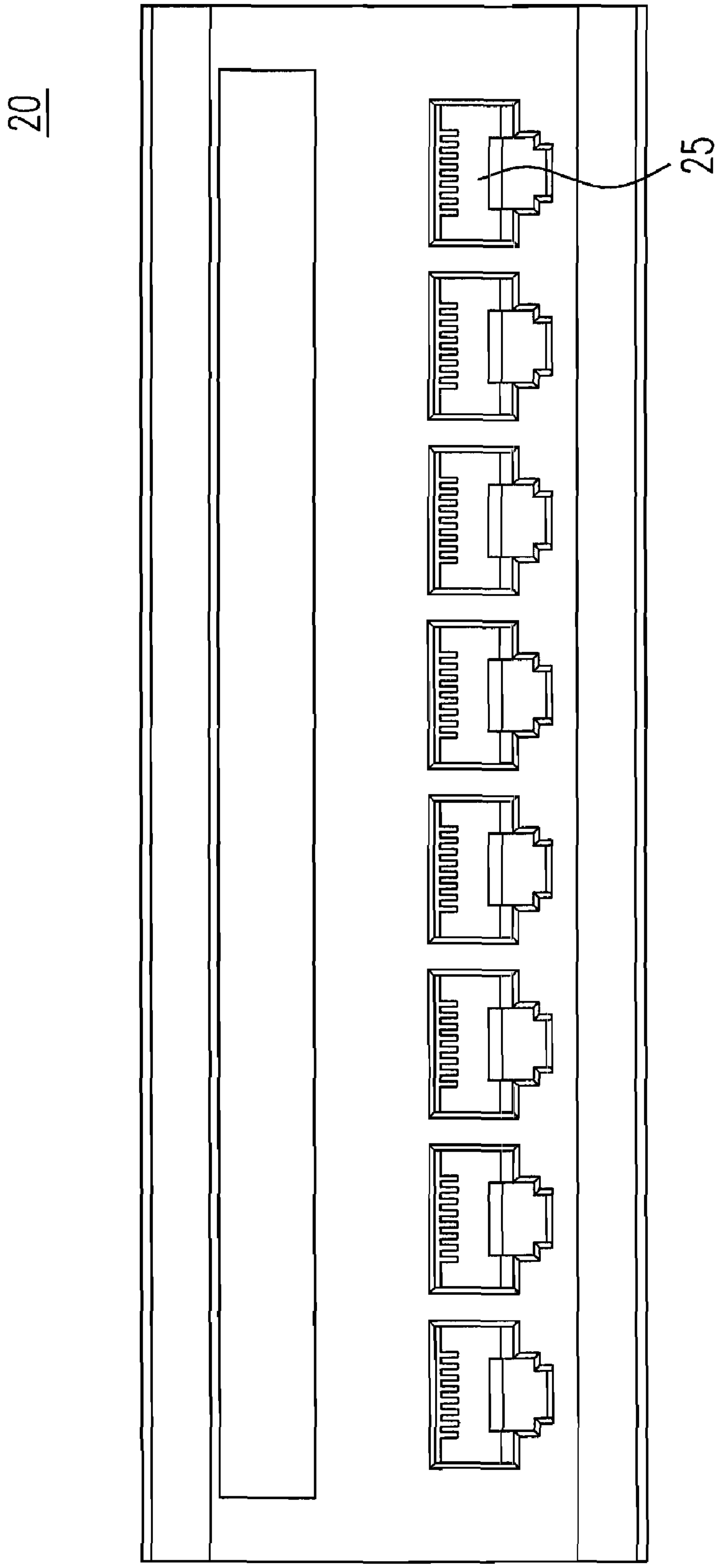
FIG. 2(*a*) shows the front view of part of the components of the network patch panel according to the first embodiment of the present invention.
Figure 2B:
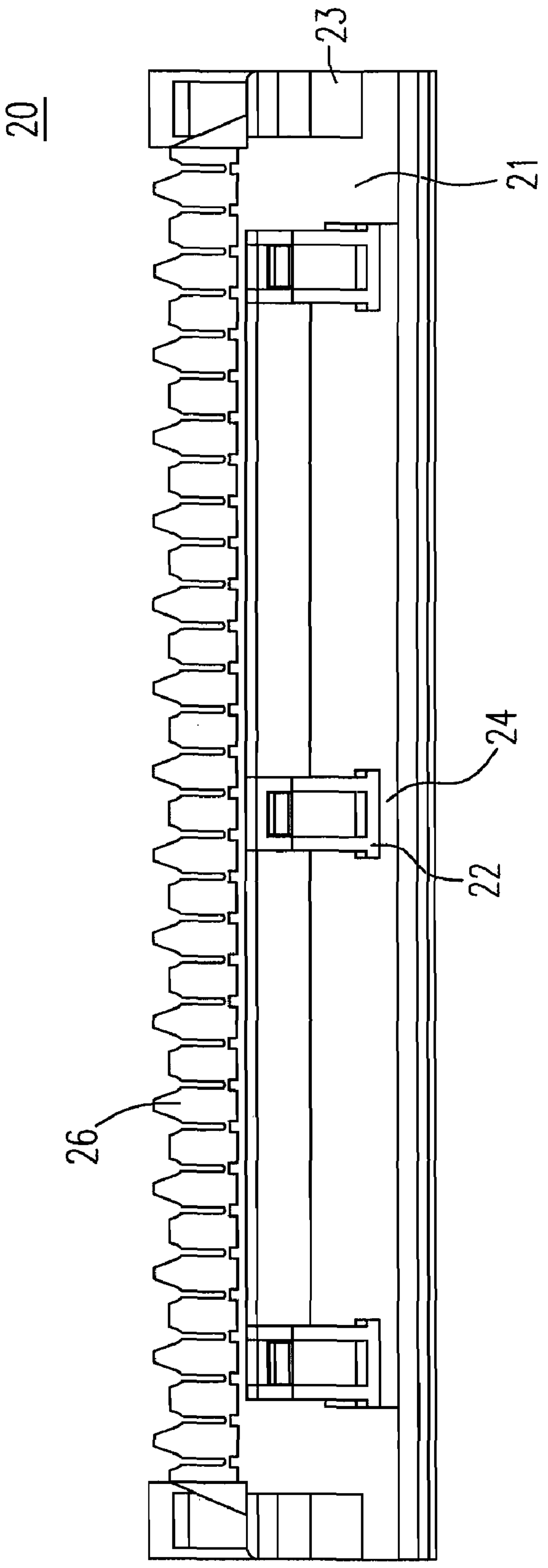
Figure 2C:
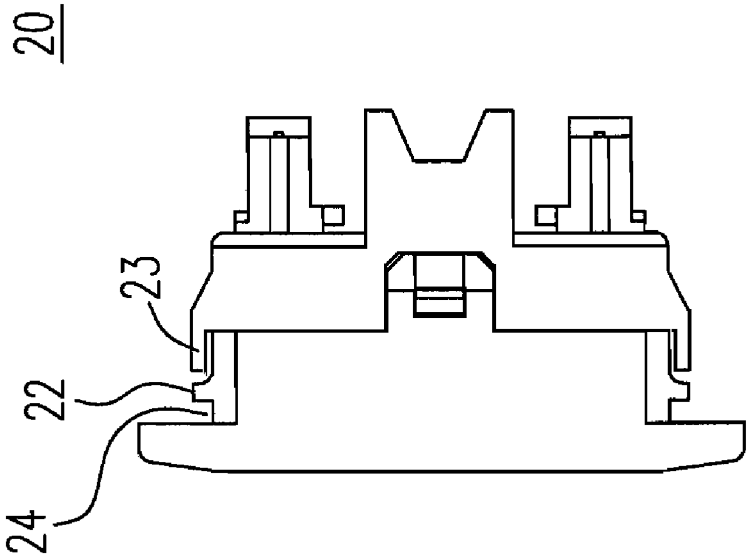

Please refer to FIG. 1, which shows the structure of part of the components of the network patch panel according to the first embodiment of the present invention. According to FIG. 1, the frame 10 has a plurality of first indentations 11, a hook component 12, and a third indentation 13. Please refer to FIGS. 2(*a*), 2(*b*) and 2(*c*), which show the front view, top view, and side view of part of the components of the network patch panel according to the first embodiment of the present invention respectively. The patch module 20 has a plurality of second indentations 21 and a plurality of first protrusions 22, which are disposed on the upper and lower sides of the patch module respectively. There is a gap 24 between the plurality of first protrusions 22 and the front side of the patch module, for assembling the patch module 20 with the frame 10 so that the patch module 20 will not fall. The right side, left side, or ends of the patch module 20 have a hook element 23, and the front side and the back side of the patch module 20 have a plurality of sockets 25 and a plurality of insulation displacement connectors 26 respectively, which connect patch cords and data cables separately.

Figure 3A:
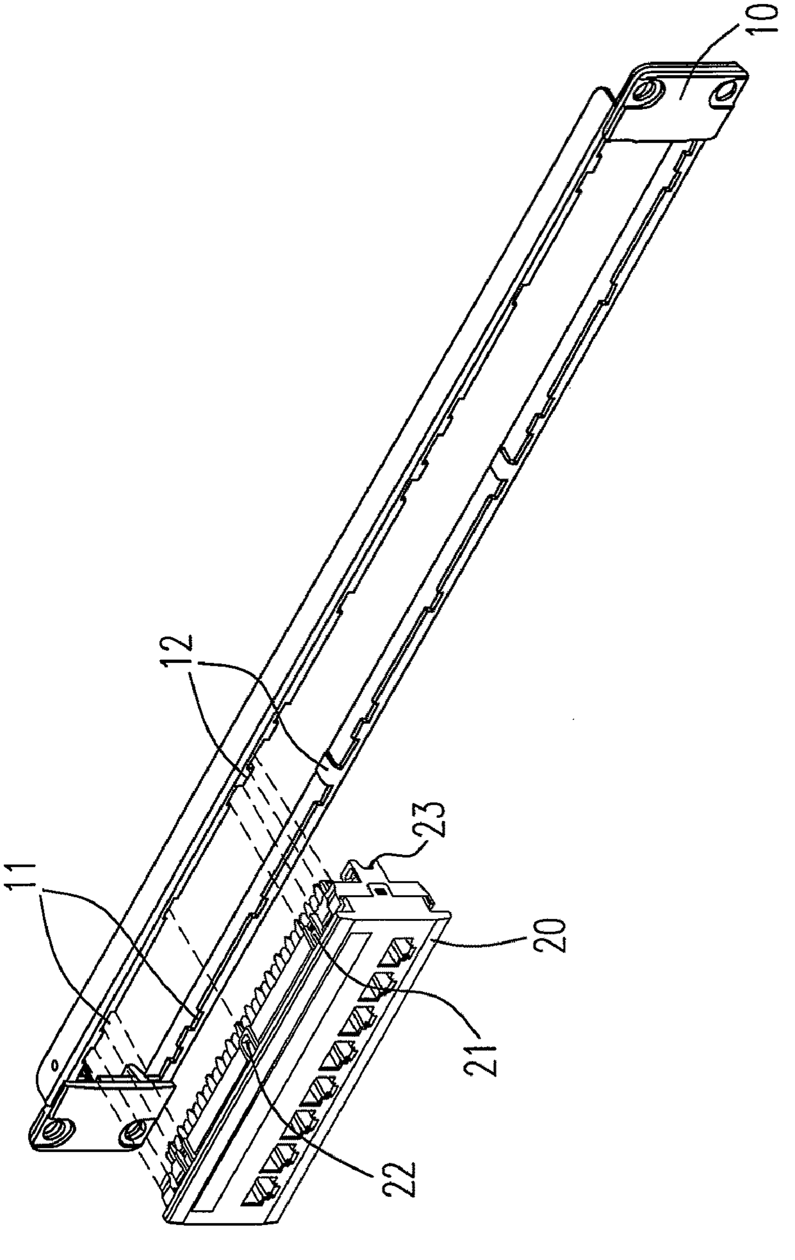
FIGS. 3(*a*)-3(*c*) show the diagrams of assembling the network patch panel according to the first embodiment of the present invention.
Figure 3B:
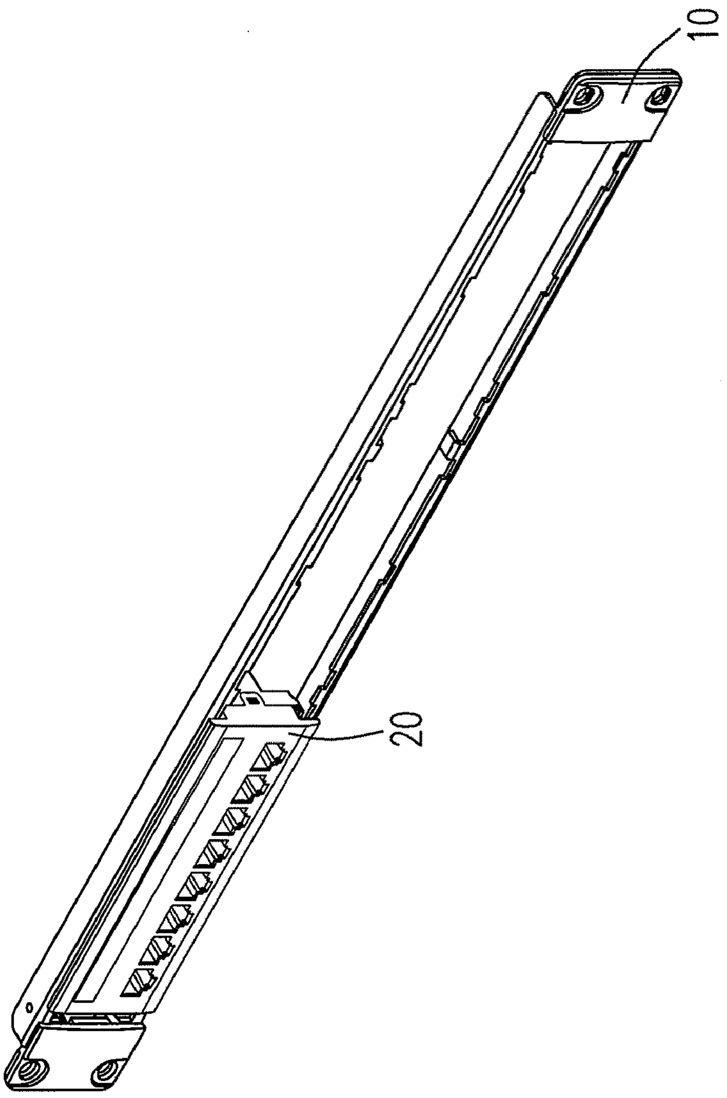
Figure 3C:
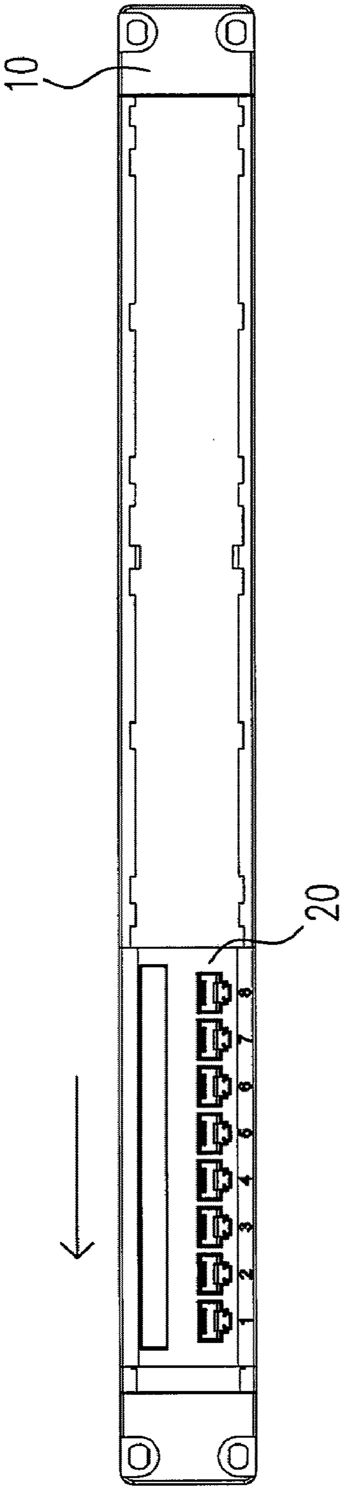

Please refer to FIGS. 3(*a*)-3(*c*), which show the diagrams of assembling the network patch panel according to the first embodiment of the present invention. When assembled, the upside of the patch module 20 has to correspond to that of the frame 10, the first protrusions 22 have to correspond to the first indentations 11, the second indentations 21 have to correspond to the hook components 12, and the patch modules 20 have to be put into the frame 10 from left to right in turn. When putting the first patch module 20 into the frame 10, there is a space between the first patch module 20 and the left side of the frame 10 for the patch module 20 to slide to left till the end. The action is finished after every protrusion between every two adjacent first indentation 11 is slid into the gap 24, so the protrusion will be disposed between the first protrusion 22 and the front side of the patch module 20, so that the patch module 20 can be assembled with the frame 10. After the first patch module 20 is installed, the second patch module 20 is put into the frame 10, and slid to left until contacting the right side of the first patch module 20.

Each first protrusion 22 has a width not larger than that of each first indentation 11, and each second indentation 21 has a width being one of larger than and equal to that of each hook component, so the patch module 20 can be put into the frame 10 to proceed assembling.

In this embodiment, the first indentation 11 and the hook component 12 on the upside are opposite to those on the downside. However, this embodiment is not limited by the above configuration, as long as the first indentation 11 can correspond to the first protrusion 22 and the second indentation 21 can correspond to the hook component 12.

Figure 4A:
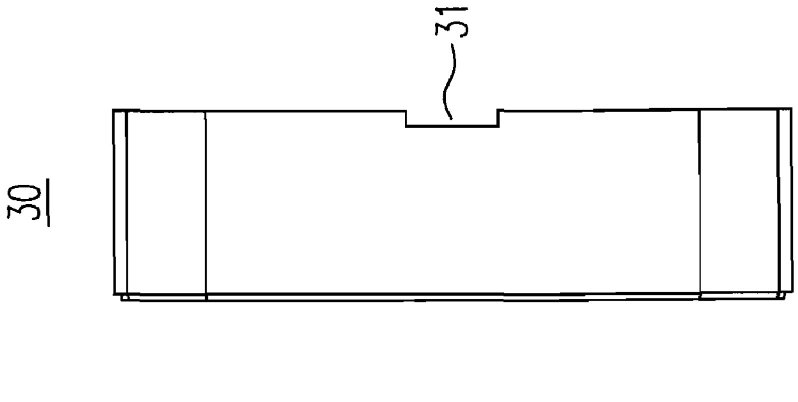
FIG. 4(*a*) shows the front view of part of the components of the network patch panel according to the first embodiment of the present invention.
Figure 4B:
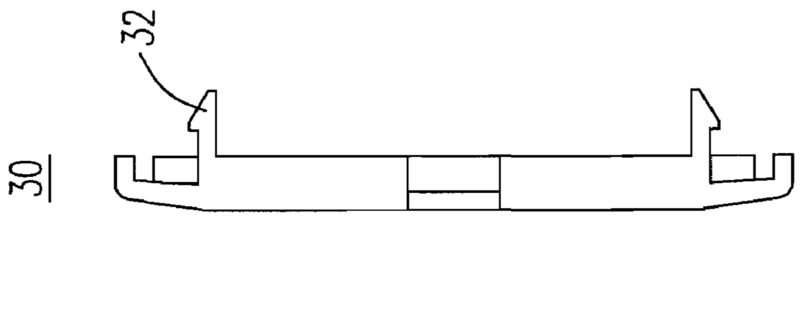
Figure 5:
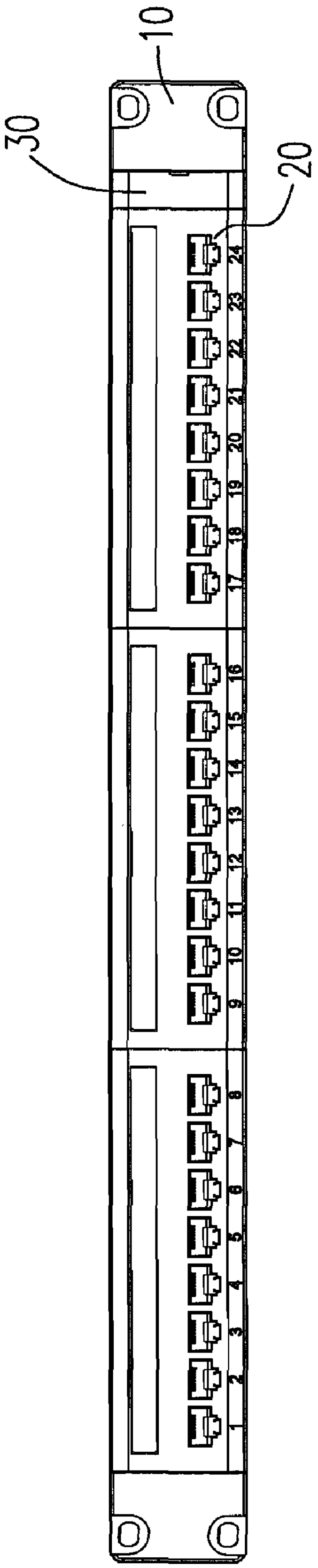
FIG. 5 shows the assembled network patch panel according to the first embodiment of the present invention.

Next, please refer to FIGS. 4(*a*) and 4(*b*), which show the front view and side view of part of the components of the network patch panel according to the first embodiment of the present invention respectively. The fixing element 30 has a hole 31 and a second protrusion 32, and is assembled within the frame 10 by inserting the second protrusion 32 into the third indentation 13 of the frame 10. The use of the fixing element 30 is to fill in the gap between the patch module 20 and the frame 10 after assembling, and fix the location of the patch module 20 so that it will not slide. Please refer to FIG. 5, which shows the assembled network patch panel according to the first embodiment of the present invention. After assembling, the fixing element 30 is disposed between the patch module 20 and the frame 10. It's simple for the user to put the fixing element 30 into the frame 10 by hand until hearing the sound of wedging, without any tools.

When disassembled, the slot screwdriver or fingernail can be used to pull up the fixing element 30 through the hole 31. Then, the patch module 20 is disassembled by taking it out from the front side according to the opposite order and direction of assembling. Thus, no matter assembling or disassembling of the patch module 20, only simple steps are performed without assistance of tools. This has much improvement in practicability and convenience.

Moreover, another advantage of the present invention is that the hook component 12 and the hook element 23 are assembled with each other after assembling. Since there's no brace or linkage between the upside and the downside of the frame 10, when forces are applied to the patch panel, the patch panel may be out of shape and bend to upside and downside respectively. Hence, when performing the wire termination, the patch module 20 may be deviated forward from the frame 10 due to the force applied on the back side thereof. The assembling of the hook component 12 and the hook element 23 can avoid this situation, and let the patch module 20 assemble tightly with the frame 10 to facilitate the wire termination.

In addition, the hook component 12 has a function of fixing the position. When disassembled, the patch module 20 has to slide to right until the first protrusion 22 reach the first indentation 11 to be taken from the frame 10. At this time, the first protrusion 22 would contact the hook component 12 exactly, which can prevent the patch module 20 from sliding without being controlled to cause the first protrusion 22 to deviate from the range of the first indentation 11 and result in difficulty in disassembling.

Figure 6:
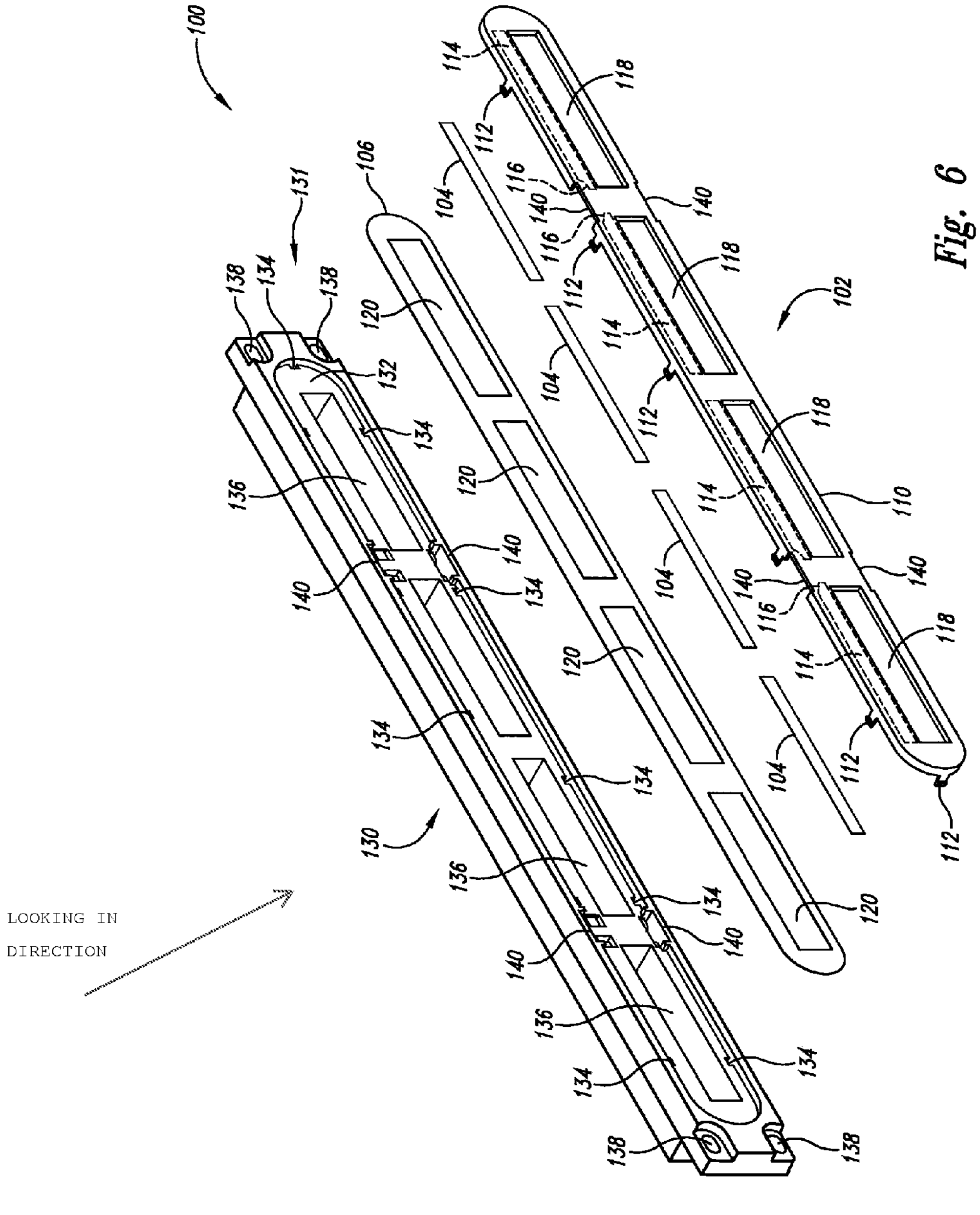
FIG. 6 shows the structure of part of the components of the network patch panel according to the second embodiment of the present invention.
Figure 7A:
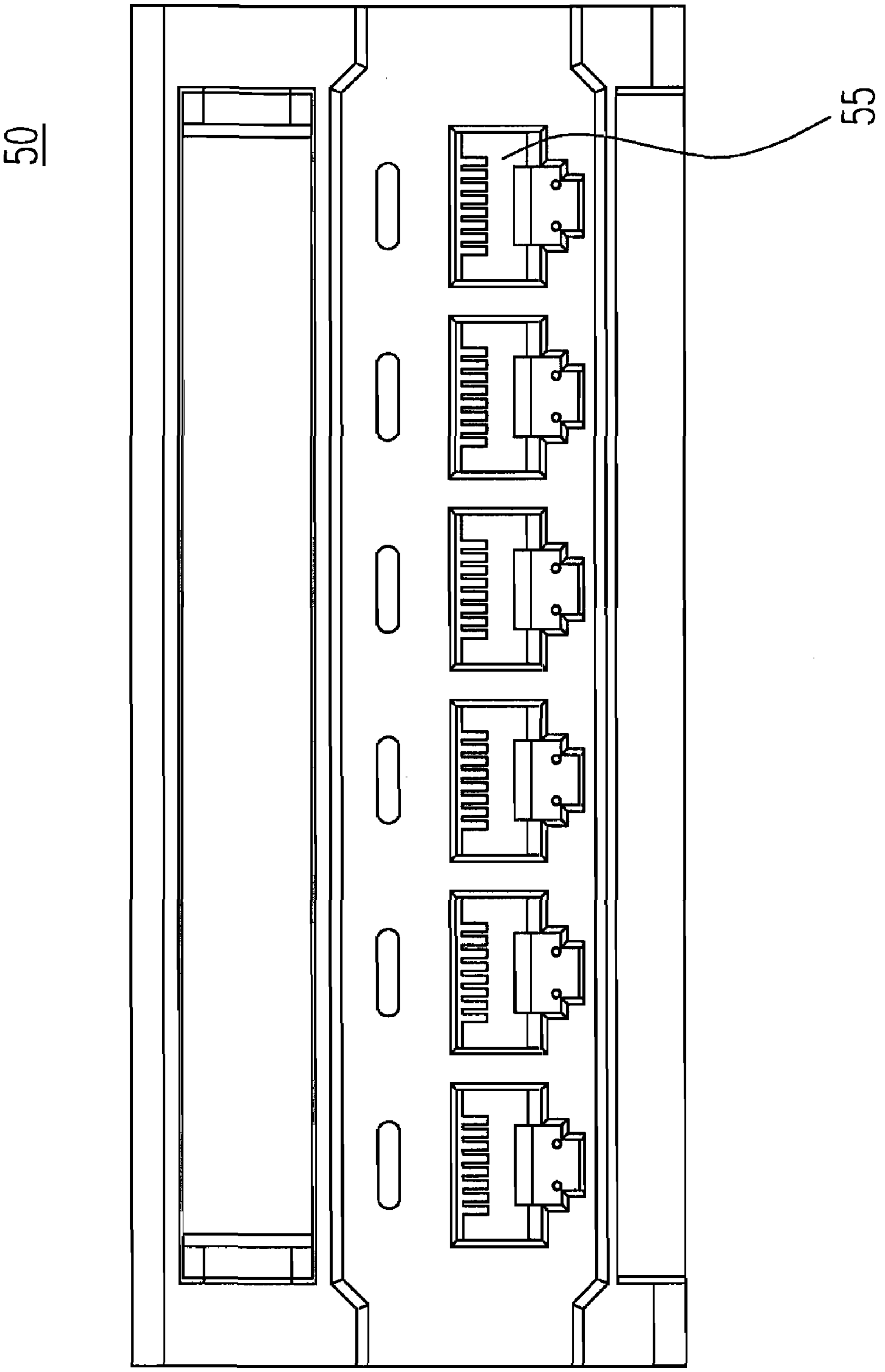
FIG. 7(*a*) shows the front view of part of the components of the network patch panel according to the second embodiment of the present invention.
Figure 7B:
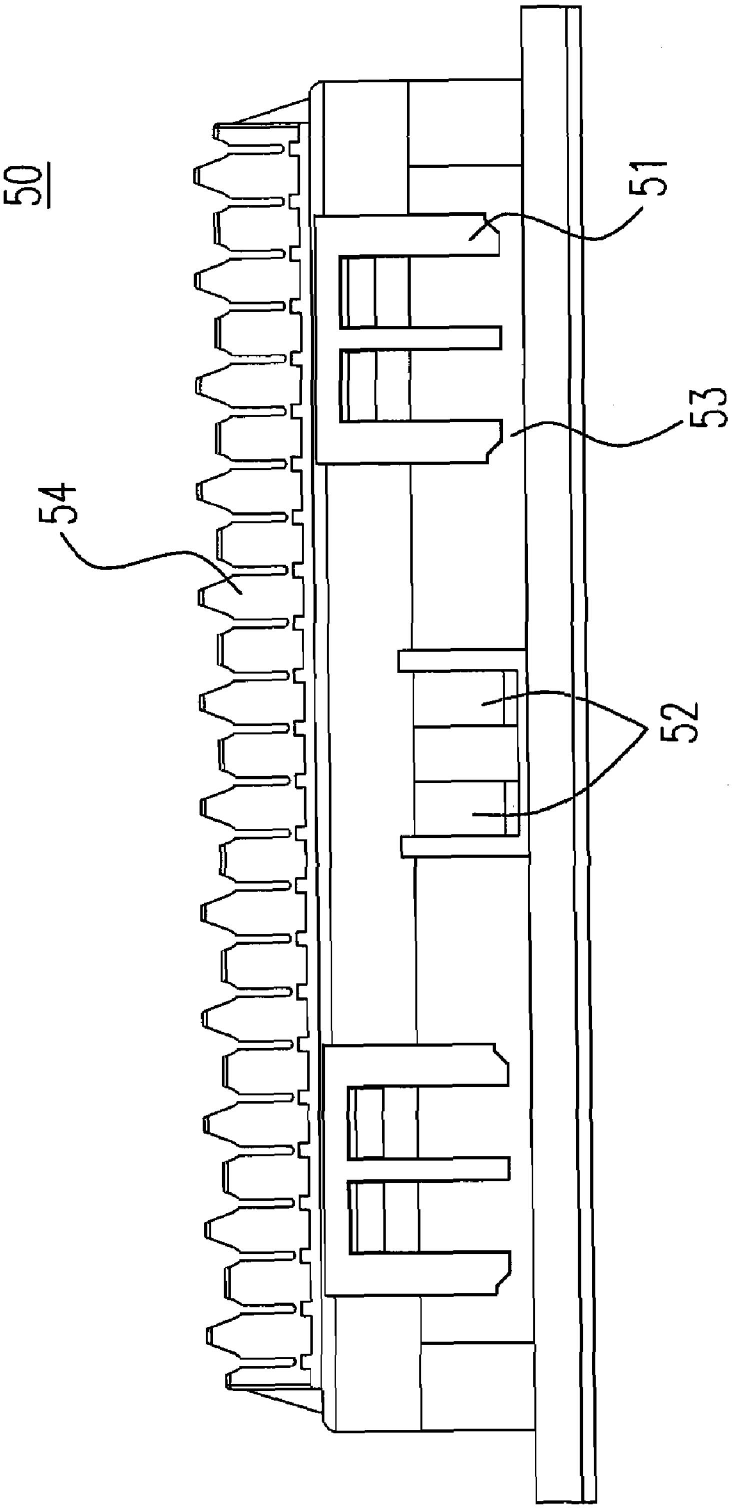
Figure 7C:
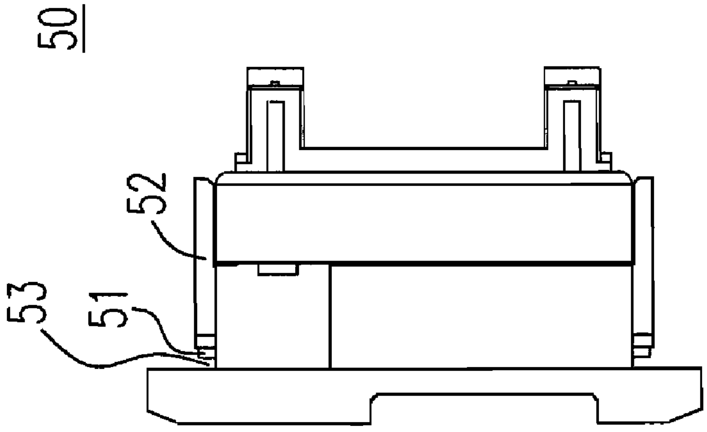
Figure 7D:
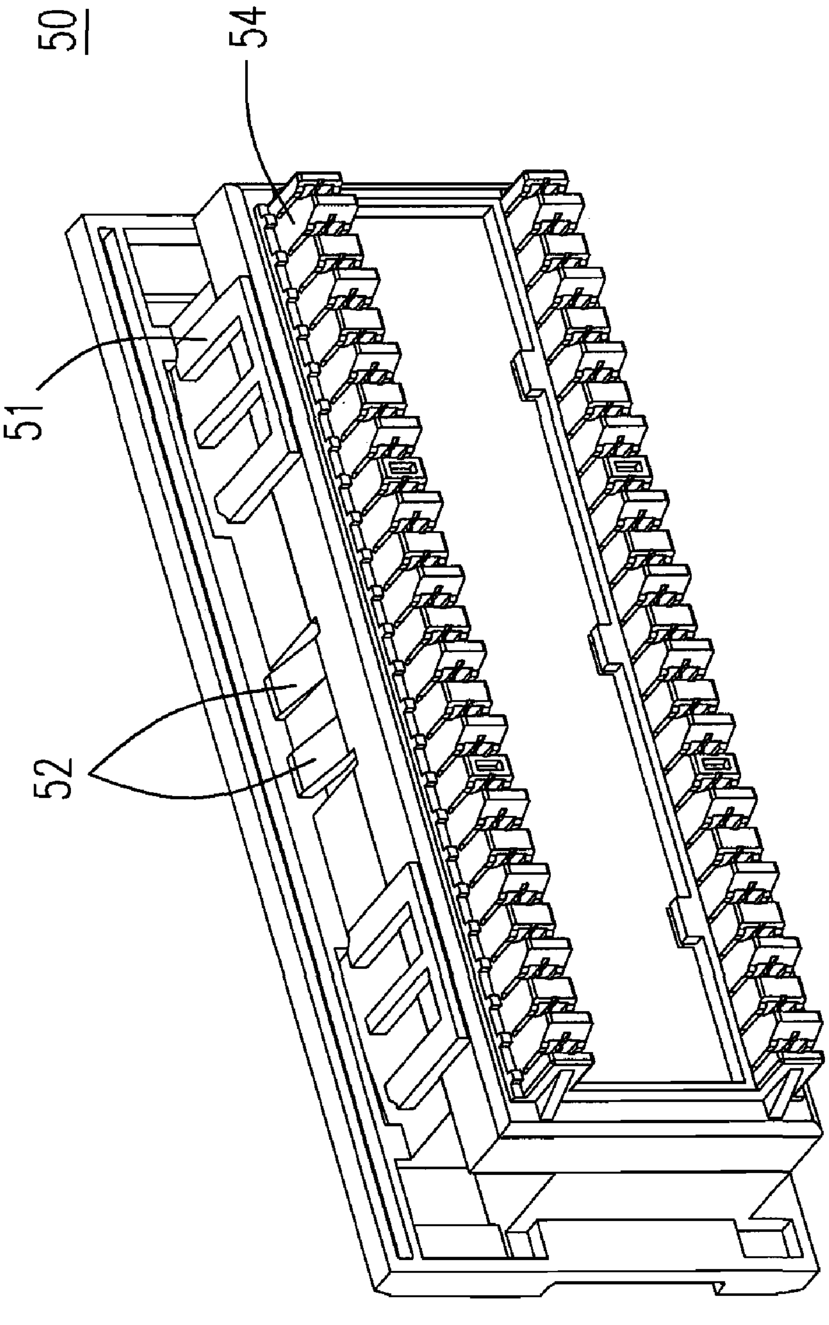

Next, the second embodiment of the present invention will be described below. Please refer to FIG. 6, which shows the structure of part of the components of the network patch panel according to the second embodiment of the present invention. According to FIG. 6, the frame 40 has a plurality of first indentations 41, a plurality of second indentations 42, and a plurality of third indentations 43 on the upside and the downside thereof. Please refer to FIGS. 7(*a*), 7(*b*), 7(*c*) and 7(*d*), which show the front view, top view, side view, and stereogram of part of the components of the network patch panel according to the second embodiment of the present invention respectively. According to FIG. 7(*b*), the patch module 50 has a plurality of first protrusions 51 and a plurality of second protrusions 52 which are disposed on the front side and the back side thereof respectively. There is a gap 53 between the plurality of first protrusions 51 and the front side of the patch module 50 for engaging the patch module 50 with the frame 40 and preventing the patch module 50 from falling. The front side and the back side of the patch module 50 have a plurality of sockets 55 and a plurality of insulation displacement connectors 54 respectively which connect patch cords and data cables separately.

When assembled, the first protrusion 51 have to correspond to the first indentation 41, and the patch module 50 is put into the frame 40. When putting the patch module 50 into the frame 40, there is a gap between the patch module 50 and the left of the frame 40, permitting the patch module 50 to slide to the left end. The action is finished by that the protrusions between each first indentation 41 slide into the gap 53, so the protrusions will be disposed between the first protrusion 51 and the front side of the patch module 50, and let the patch module 50 assemble with the frame 40.

In this embodiment, the second protrusion 52 is a structure having elasticity. As shown in FIG. 7(*d*), the lower part of the second protrusion 52 is raised upward, and thus can be pressed to make the patch module 50 movable. When the patch module 50 is put into the frame 40, the second protrusion 52 will be pressed by the protrusion between each indentation on the frame 40, which causes the lower part of the second protrusion 52 to be flattened. Subsequently, the patch module 50 is slid to left till the end, and the second protrusion 52 will be disposed on the second indentation 42 exactly. At this time, the lower part of the second protrusion 52 will spring again and fill in the second indentation 42, and the patch module 50 could not slide anymore and is assembled with the frame 40.

Please refer to FIG. 7(*b*) again. When the patch module 50 slides to left till the end and is fixed with the frame 40, the left part of the first protrusion 51 will be deviated from the range of the first indentation and blocked by the protrusion beside the indentation on the frame 40. Thus, the patch module 50 will not be deviated from the frame 40, so that the patch module 50 and the frame 40 can be fixed with each other stably.

After the first patch module 50 is installed, continually the second patch module 50 is put into the frame 40. Similarly, the above-mentioned steps are performed until all patch modules 50 are assembled with the frame 40.

Each first indention 41 has a width being one of larger than and equal to that of each the first protrusion 51. Each second indentation 42 has a width being one of larger than and equal to that of each the second protrusion 52. Hence, the patch module 50 could be put into the frame 40 for assembling.

In this embodiment, the first indentation 41, the second indentation 42, and the third indentation 43 on the upside of the frame 40 are opposite to those on the downside thereof, and so are the first protrusion 51 and the second protrusion 52. However, this embodiment is not limited by the above configuration, as long as the first indentation 41 can correspond to the first protrusion 51, and the second indentation 42 can correspond to the second protrusion 52.

Figure 8:
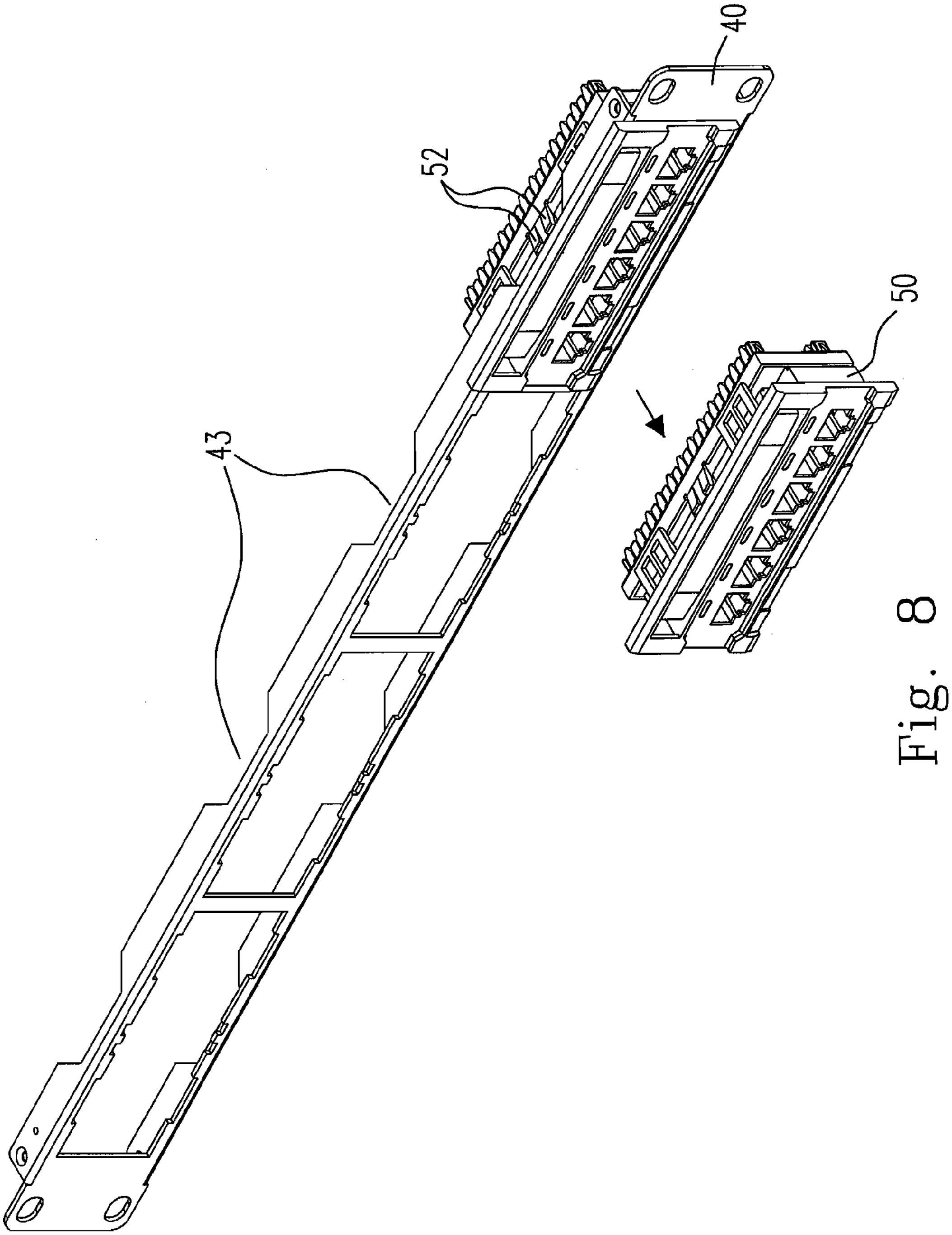
FIG. 8 shows the disassembling relationship between the patch module and the frame according to the second embodiment of the present invention.

Please refer to FIG. 8. When disassembled, the slot screwdriver or fingernail can be used to press the lower part of the second protrusion 52, and then the patch module 50 is disassembled by taking it rightward. The function of the third indentation 43 is to expose the second protrusion 52 for users to directly press. Similarly, no matter assembling or disassembling of the patch module 50, only simple steps are performed without assistance of tools. This has much improvement in practicability and convenience.

Applications of the present invention are not limited in Cat 5, Cat 5e, Cat 6, and other network cabling standards. Therefore in practice, the range of use can be largely expanded, and the defects and deficiency of the traditional network patch panel can be mended.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A network patch panel, comprising:

a frame having an edge forming a front surface, and having a plurality of first indentations and a plurality of second indentations formed on the edge of the frame and located on the front surface; and a patch module, having a plurality of first protrusions and a plurality of second protrusions, a front side and a gap between the front side and each first protrusion for wedging the patch module with the frame, wherein the patch module is assembled within the frame by inserting each of the first protrusions into a corresponding one of the plurality of first indentations thereof, and fixed to the frame by inserting each the second protrusion into a corresponding one of the plurality of second indentations thereof.

2. A network patch panel as claimed in claim 1, wherein each the first indentation has a first width being one of larger than and equal to that of the each first protrusion, and each the second indentation has a second width being one of larger than and equal to that of the each second protrusion.

3. A network patch panel as claimed in claim 1, wherein the second protrusion has elasticity.

4. A network patch panel as claimed in claim 1, wherein the patch module has a front side having a plurality of sockets for connecting network patch cords, and a back side having a plurality of insulation displacement connectors.

5. A network patch panel as claimed in claim 1, wherein each the first indentation is disposed corresponding to the each first protrusion, and each the second indentation is disposed corresponding to the each second protrusion.

6. A network patch panel as claimed in claim 1, wherein the frame has a plurality of third indentations for exposing a part of each the second protrusion.

7. A patch panel, comprising:

a frame having an edge forming a front surface, and having a plurality of first indentations and a hook component formed on the edge of the frame and located on the front surface; and a patch module having a front side, an end, a hook element disposed on the end, a plurality of first protrusions, each of which corresponds to one of the plurality of first indentations, and a gap between the front side and each first protrusion for wedging the patch module with the frame, wherein the hook element is coupled with the hook component when the patch module is assembled within the frame by inserting each the first protrusion into the corresponding first indentation thereof.

8. A patch panel as claimed in claim 7, wherein the frame has a second indentation, and the patch panel further comprises a fixing element having a second protrusion, and the fixing element is assembled within the frame by inserting the second protrusion into the second indentation, and disposed between the patch module and the frame for fixing the patch module.

9. A patch panel as claimed in claim 7, wherein each the first protrusion has a first width not larger than that of each the first indentation, and the patch module further has a second indentation having a second width being one of larger than and equal to that of the hook component.

10. A network patch panel, comprising:

a frame having an edge forming a front surface, and having a first indentation formed on the edge and located on the front surface; and a patch module having a first protrusion, a front side and a gap between the front side and the first protrusion for wedging the patch module with the frame, wherein the patch module is assembled with the frame by coupling the first protrusion with the indentation.

11. A network patch panel as claimed in claim 10, further comprising:

a fixing element disposed between the patch module and the frame, having a second protrusion for fixing the patch module, and having a hole for disassembling the fixing element from the patch module.

12. A network patch panel as claimed in claim 10, wherein the first protrusion has a width not larger than that of the first indentation.

13. A network patch panel as claimed in claim 10, wherein the frame has at least a further one of the first indentations, and the patch module has at least a further one of the first protrusions.

14. A network patch panel as claimed in claim 13, wherein the frame includes an upside and a downside respectively having the plurality of first indentations and a hook component disposed thereon.

15. A network patch panel as claimed in claim 14, wherein the plurality of first indentations on the upside are opposite to those on the downside.

16. A network patch panel as claimed in claim 14, wherein the patch module further has a second indentation having a width being one of larger than and equal to that of the hook component.

17. A network patch panel as claimed in claim 14, wherein the patch module has a right side, a left side and a hook element disposed on one of the right side and the left side for coupling the hook component.

18. A network patch panel as claimed in claim 10, wherein the patch module has a front side, a back side, a plurality of sockets disposed on the front side for connecting network patch cords, and a plurality of insulation displacement connectors disposed on the back side.

* * * * *